(12) United States Patent
Comte et al.

(10) Patent No.: US 9,650,286 B2
(45) Date of Patent: May 16, 2017

(54) BETA-QUARTZ GLASS CERAMICS WITH CONTROLLED TRANSMISSION AND METHODS OF MAKING SAME

(75) Inventors: Marie Jacqueline Monique Comte, Fontenay aux Roses (FR); Isabelle Marie Melscoët-Chauvel, Bois-le-Roi (FR); Michel Jean Gerard Lismonde, Brasles (FR)

(73) Assignee: EUROKERA, Chateau-Thierry (FR)

( * ) Notice: Subject to any disclaimer, the term of this patent is extended or adjusted under 35 U.S.C. 154(b) by 134 days.

(21) Appl. No.: 14/117,383

(22) PCT Filed: May 16, 2012

(86) PCT No.: PCT/EP2012/059116
§ 371 (c)(1),
(2), (4) Date: Feb. 26, 2015

(87) PCT Pub. No.: WO2012/156444
PCT Pub. Date: Nov. 22, 2012

(65) Prior Publication Data
US 2015/0197444 A1 Jul. 16, 2015

(30) Foreign Application Priority Data
May 16, 2011 (FR) ..................... 11 54213

(51) Int. Cl.
| C03C 10/00 | (2006.01) |
| C03C 4/02 | (2006.01) |
| C03C 3/087 | (2006.01) |
| C03C 4/10 | (2006.01) |
| C03B 32/02 | (2006.01) |

(52) U.S. Cl.
CPC ............. *C03C 3/087* (2013.01); *C03B 32/02* (2013.01); *C03C 4/02* (2013.01); *C03C 4/10* (2013.01); *C03C 10/0027* (2013.01); *C03C 10/0054* (2013.01); *C03C 2204/00* (2013.01)

(58) Field of Classification Search
CPC ....... C03C 3/087; C03C 10/0054; C03C 4/02; C03C 10/0027; C03C 4/10; C03C 2204/00; C03B 32/02
See application file for complete search history.

(56) References Cited

U.S. PATENT DOCUMENTS

| 3,509,015 A | 4/1970 | Wismer et al. |
| 4,125,669 A | 11/1978 | Triebel et al. |
| 4,234,533 A | 11/1980 | Langlands |
| 4,461,839 A | 7/1984 | Rittler ............... 501/4 |
| 5,070,045 A | 12/1991 | Comte et al. |
| 5,118,371 A | 6/1992 | Hori et al. |
| 5,176,961 A | 1/1993 | Crooker et al. ............. 428/409 |
| 5,212,122 A * | 5/1993 | Pannhorst ........... C03C 10/0027 501/64 |
| 5,268,049 A | 12/1993 | Marriott et al. |
| 5,277,723 A | 1/1994 | Kodama et al. |
| 5,779,844 A | 7/1998 | Lewis et al. |
| 5,830,548 A | 11/1998 | Andersen et al. |
| 5,922,271 A | 7/1999 | Semar et al. ................ 264/602 |
| 6,598,426 B2 | 7/2003 | Vandal et al. |
| 7,063,760 B2 | 6/2006 | Sklyarevich et al. |
| 7,140,204 B2 | 11/2006 | Vandal |
| 7,344,613 B2 | 3/2008 | Sklyarevich et al. |
| 7,465,686 B2 | 12/2008 | Comte |
| 7,473,660 B2 | 1/2009 | Comte |
| 7,476,284 B2 | 1/2009 | Sklyarevich et al. |
| 7,704,342 B2 | 4/2010 | Bourcier et al. |
| 7,754,337 B2 | 7/2010 | Hatta et al. |
| 9,061,937 B2 | 6/2015 | Siebers et al. |
| 2003/0218001 A1 | 11/2003 | Siebers et al. |
| 2004/0182493 A1 | 9/2004 | Chick |
| 2005/0150586 A1 | 7/2005 | Sklyarevich et al. |
| 2006/0231190 A1 | 10/2006 | Sklyarevich et al. |
| 2009/0100872 A1 | 4/2009 | Hawtof et al. .................... 65/36 |
| 2009/0217705 A1 | 9/2009 | Filippov et al. .............. 65/99.1 |
| 2009/0286013 A1 | 11/2009 | Cook et al. .................. 427/595 |
| 2009/0314034 A1 | 12/2009 | Goulas et al. |
| 2010/0224619 A1 | 9/2010 | Schoenberger |
| 2010/0304520 A1 | 12/2010 | Hiyama |
| 2012/0035041 A1 | 2/2012 | Comte |

FOREIGN PATENT DOCUMENTS

| DE | 202010014361 | 12/2010 |
| EP | 2065181 | 6/2009 |
| FR | 2749579 | 6/1997 |
| FR | 2946041 A1 | 12/2010 |
| FR | 2946042 A1 | 12/2010 |
| FR | 2963617 A1 | 2/2012 |
| JP | 05218654 A | 8/1993 |
| JP | 1993218654 | 8/1993 |
| JP | 11100229 A | 4/1999 |
| WO | 8803517 | 5/1988 |
| WO | 9840324 | 9/1998 |

(Continued)

OTHER PUBLICATIONS

French Search Report, dated Jan. 30, 2012.
PCT Search Report, dated Aug. 16, 2012.
The State Intellectual Property Office of the People's Republic of China, Second Office Action and Search Report, Application No. 201280023637.1, Date of dispatch Apr. 26, 2016, 13 pages, China (manual translation).
CN201280023637.1; Chinese Search Report dated Jul. 27, 2015.
Chinese First Office Action Dated Jun. 19, 2015 App No. 201280023637.1.

*Primary Examiner* — Laura Auer

(57) ABSTRACT

Beta-quartz glass-ceramics containing in their composition neither arsenic oxide nor antimony oxide and having a controlled transmission curve, articles made using the glass-ceramics, including cooktops, and precursor glasses of such glass-ceramics.

9 Claims, No Drawings

(56) References Cited

FOREIGN PATENT DOCUMENTS

| WO | 0216279 A1 | 2/2002 |
| WO | 2007003567 | 1/2007 |
| WO | 2007065910 | 6/2007 |
| WO | 2009051649 | 4/2009 |
| WO | 2009064892 | 5/2009 |
| WO | 2010137000 A2 | 12/2010 |
| WO | 2012016724 A2 | 2/2012 |

* cited by examiner

BETA-QUARTZ GLASS CERAMICS WITH CONTROLLED TRANSMISSION AND METHODS OF MAKING SAME

This application claims the benefit of priority under 35 U.S.C. §365 of International Patent Application Serial No. PCT/EP2012/059116 filed on May 16, 2012 designating the United States of America, which in turn claims the benefit of priority under 35 U.S.C. §119 of French Patent Application Serial No. 1154213, filed on May 16, 2011, the contents of which are relied upon and incorporated herein by reference in their entirety.

BACKGROUND

The present disclosure relates to glass-ceramics of the lithium aluminosilicate type, having a dark color and containing a solid solution of β-quartz as the predominant crystalline phase. The disclosure also relates to articles made from such glass-ceramics, precursor glasses for such glass-ceramics, and methods for obtaining such glass-ceramics and related articles.

DETAILED DESCRIPTION

Applicant is a manufacturer of glass-ceramic products intended for the home market, such as cooktops, fire proof doors and windows, stove and oven windows, fireplace inserts, etc. They have been producing millions of lithium aluminosilicate glass-ceramic cooktops for the last 20 years. They have notably produced plates such as described in U.S. Pat. No. 5,070,045 and more particularly such plates of a glass-ceramic containing a solid solution of β-quartz as the predominant crystalline phase, colored with vanadium oxide ($V_2O_5$), and marketed under the brand Kerablack®. These plates have characteristic properties and notably a coefficient of thermal expansion close to zero (in order to withstand thermal shocks) associated with a specific optical transmission curve. Said specific optical transmission curve for a thickness of 4 mm is such that the integrated optical transmission $T_V$, in the visible range (between 380 and 780 nm, as measured with the illuminant D65, the observer at 2°) is between 0.8 and 2%, advantageously between 1 and 1.7%. One therefore has $0.8 \leq T_V \leq 2\%$, advantageously $1\% \leq T_V \leq 1.7\%$. If the integrated optical transmission is greater than 2%, the heating elements, laid out under the plate, are not concealed when they are out of operation and if said integrated optical transmission is less than 0.8%, said heating elements in operation are not visible (safety problem).

The optical transmission at 625 nm for a thickness of 4 mm is greater than 3.5%, advantageously greater than 4% ($T_{625} > 3.5\%$, advantageously $T_{625} > 4\%$). With this, it is possible to see red displays (the most commonly used color) laid out under the plate. The optical transmission at 950 nm (near infrared) for a thickness of 4 mm is between 50 and 70% ($50\% \leq T_{950} \leq 70\%$). With this it is possible to use conventional electronic control buttons, emitting and receiving at this wavelength. The infrared optical transmission at 1,600 nm for a thickness of 4 mm is between 65 and 75% ($65\% \leq T_{1600} \leq 75\%$). If said infrared optical transmission is less than 65%, the heating performances of the plate are not satisfactory and if said infrared optical transmission is greater than 75%, said heating performances are excessive and may induce dangerous heating of materials placed in proximity to the plate.

The plates of this type give entire satisfaction. However, their composition contains arsenic oxide, which is used as a fining agent during the step of melting the vitrifiable load of raw materials used. One skilled in the art is aware of the three successive steps applied for obtaining glass-ceramic articles: melting and fining of a vitrifiable load of raw materials and then shaping, and then a crystallization heat treatment (also called ceramming treatment) and, for obvious reasons of protection of the environment, it is desired to avoid the use of this toxic compound. It is incidentally noted that the U.S. Pat. No. 5,070,045 mentions arsenic oxide and antimony oxide as conventional fining agents. As both of these products are toxic, the use of either one is desirably avoided. Applicant therefore desired to develop novel performing plates, having the same optical transmission properties (functional properties: see above) as Kerablack® plates, but free of arsenic oxide (and of antimony oxide) in their composition.

Tin oxide ($SnO_2$) has been recommended for many years as a fining agent, instead and in place of arsenic oxide (and/or antimony oxide). This substitution is however not totally neutral.

On the one hand, tin oxide is a less performing fining agent than arsenic oxide. Thus, in absolute terms, it should be involved in a relatively large amount, which is not without posing problems, more particularly of devitrification. Thus, various alternatives were proposed according to the prior art for obtaining highly performing fining and notably applying fining with said tin oxide at a higher temperature (see EP 1 313 675), and using fining auxiliaries such as fluorine, bromine, manganese oxide and/or cerium oxide together with said tin oxide (see WO 2007/03566, WO 2007/03567 and WO 2007/065910, respectively).

On the other hand, tin oxide is a more powerful reducing agent than arsenic oxide (and antimony oxide). Thus, its influence on the coloration (i.e. on the optical transmission properties) of the final glass-ceramic is different from that of arsenic oxide (and antimony oxide). One skilled in the art indeed is aware that tin and arsenic oxides (or even antimony oxides), in addition to their "first" function of a fining agent, are indirectly involved in the process for coloring the final glass-ceramic insofar that they reduce the vanadium oxide present during ceramming (the reduced forms of said vanadium oxide being responsible for coloration). This is perfectly explained in the teaching of patent application EP 1 313 675.

Providing glass-ceramic plates, without arsenic (or antimony) in their composition, obtained with efficient fining of the vitrifiable raw material (fining applied at a conventional fining temperature, generally between 1,600 and 1,700° C.) and exhibiting the same optical transmission curve as the plates of the prior art with arsenic (and/or antimony) in their composition (Kerablack® plates), was therefore the technical problem tackled by the inventors.

Of course, many documents of the prior art have already described glass-ceramics of the lithium aluminosilicate type, containing a solid solution of β-quartz as the predominant crystalline phase, colored with vanadium oxide and containing tin oxide (involved as a fining agent). Said documents do not however propose the glass-ceramics of the present disclosure, and meeting the specifications discussed above.

Japanese Patent Application Number 11-100229 is, to the knowledge of the Applicant, the first document of the prior art to have recommended the use of $SnO_2$ (optionally in combination with chlorine: Cl) as a fining agent. This document mentions the presence of 0.1 to 2% by weight of $SnO_2$ in the composition of glass-ceramics transmitting infrared; it expressly describes $SnO_2$ contents from 0.7 to 1% by weight (in the absence of Cl) and from 0.9 to 1.9% by weight (in the presence of Cl). Such high contents raise concerns on devitrification problems. This document contains little teaching on the optical transmission curves of the described glass-ceramics, it does not contain any teaching on the control of said curves.

EP Patent Application 1 313 675, already mentioned above, also describes the use of $SnO_2$ (used at maximum contents of 0.3% by weight in the examples) as a fining agent. Carrying out fining at a high temperature (1,975° C. for 1 hour) is recommended for obtaining glass-ceramics of good quality. Provision is made within the composition for the possible presence, in addition to that of $V_2O_5$, of other coloring agents such as chromium, manganese, iron, cobalt, nickel, copper, selenium and chlorine compounds. However, for optimizing the optical transmission of infrared, it is indicated in this document that it is hardly desirable to involve coloring agents in addition to $V_2O_5$, such coloring agents absorbing in the infrared.

Patent applications WO 2007/03566, WO 2007/03567 and WO 2007/065910 recommend, as indicated above, the presence of fining auxiliaries. The examples show said fining auxiliaries associated with 0.2% by weight of $SnO_2$. The possible presence of the conventional coloring agents (in addition to $V_2O_5$) is mentioned. In these documents no teaching is found on the optical transmission curves of the described glass-ceramics.

Patent application WO 2008/056080 describes an original technique (floating) for obtaining glass-ceramic plates. It mentions the opportune use of $SnO_2$ as a fining agent, as well as that of coloring agents ($Fe_2O_3$, $Cr_2O_3$, $V_2O_5$ ... ). This document does not contain any teaching on optical transmission curves.

Patent application DE 10 2008 050 263 describes glass-ceramics, the composition of which is optimized with reference to transmission in the visible range (red, but also blue, green). The composition of said glass-ceramics contains $SnO_2$ as a fining agent (less than 0.3% in the examples), $V_2O_5$ as a "main" coloring agent as well as optionally other coloring agents (chromium, manganese, cobalt, nickel, copper, selenium, rare earth and molybdenum compounds ... ). It is also indicated in this document that the presence of these other coloring agents is detrimental to optical transmission in the infrared.

Patent application FR 2 946 042 describes plates having an optical transmission from 0.2 to 4% for at least one wavelength between 400 and 500 nm (blue). The described plates contain less than 0.3% by weight of $SnO_2$ and $V_2O_5$ as a "main" coloring agent, as well as optionally other coloring agents such as $Fe_2O_3$, NiO, CuO and MnO. Advantageously they contain less than 25 ppm of chromium oxide.

Patent application WO 2010/137000 also describes glass-ceramic plates transmitting blue light. These plates, which may contain $As_2O_3$ or $SnO_2$ as a fining agent, contain a specific combination of vanadium oxide ($V_2O_5$) and cobalt oxide (CoO). They may also contain other coloring agents (NiO, only in a small amount) but advantageously they only contain $V_2O_5$ and CoO.

Patent application WO 2011/089220 discloses an optimization of the base composition of the glass-ceramic with reference to its mechanical stability and aging properties notably. It does not contain any teaching on the optical transmission properties and their control.

Patent application WO 2012/016724 teaches the benefit of controlling the chemical oxygen demand (COD) of a lithium aluminosilicate glass with the purpose of optimizing its fining.

In such a context, the inventors have therefore elaborated glass-ceramics, free of arsenic (and of antimony), having an optimized optical transmission curve with reference to their use, more particularly as cooktops. They are thus able to propose substitutes for the existing Kerablack® plates. Their disclosure is based on an original association, within the composition of glass-ceramics, of $SnO_2$ (which provides the fining agent function and then the reducing agent function, said reducing agent participating in the final coloration of the product) and of coloring species ($V_2O_5+Fe_2O_3+Cr_2O_3$). This is explained hereafter.

According to a first embodiment, the present disclosure relates to glass-ceramics of the lithium aluminosilicate (LAS) type. They contain $Li_2O$, $Al_2O_3$ and $SiO_2$ as essential constituents of the β-quartz solid solution. They contain a β-quartz solid solution as the predominant crystalline phase where said β-quartz solid solution accounts for more than 80% by weight of the total crystalline phase (of the crystallized fraction), and have the same or substantially the same optical transmission curve as the glass-ceramic of the Kerablack® plates. Further, they have the optical transmission characteristics hereafter, for a thickness of 4 mm of $0.8\% \leq T_v \leq 2\%$, advantageously $1\% \leq T_v \leq 1.7\%$, $T_{625} > 3.5\%$, advantageously $T_{625} > 4\%$, $50\% \leq T_{950} \leq 70\%$, and $65\% \leq T_{1600} \leq 75\%$.

These are glass-ceramics of dark color, most particularly suitable for use as cooktops.

In a characteristic way, the composition of these glass-ceramics, expressed as percentages by weight of oxides, contains:

| | |
|---|---|
| $SnO_2$ | 0.3-0.6, advantageously >0.3-0.6 |
| $V_2O_5$ | 0.025-0.06, advantageously 0.025-0.045 |
| $Cr_2O_3$ | 0.01-0.04 |
| $Fe_2O_3$ | 0.05-0.15 |
| $As_2O_3 + Sb_2O_3$ | <0.1, advantageously <0.05. |

Said composition therefore contains $SnO_2$ as a fining agent. The fining is all the more easier to apply and all the more performing since the amount of $SnO_2$ present is significant. However it should be kept in mind that any devitrification should be minimized or even avoided and the influence of said $SnO_2$ on the optical transmission should be controlled (i.e. on the coloration). In fact $SnO_2$ is capable of reducing the vanadium and the iron present during ceramming, though due to the high raw material cost for $SnO_2$, its use is advantageously minimized. An $SnO_2$ content from 0.3 to 0.6% by weight may be used. Such a content is advantageously greater than 0.3% by weight (greater than the $SnO_2$ content of many glass-ceramics of the prior art). Preferably, the disclosed glass-ceramics contain more than 0.36% and up to 0.5% by weight of $SnO_2$. More preferably they contain from 0.35 to 0.45 by weight of $SnO_2$. A content of 0.4% by weight or close to 0.4% by weight (0.40±0.03) may be used.

The disclosed glass-ceramics contain neither any $As_2O_3$, nor any $Sb_2O_3$ or only contain traces of at least one of these toxic compounds, $SnO_2$ being present instead of and in place of these conventional fining agents. If traces of at least one of these compounds are present, this is as a contaminating product, for example, due to the presence of recycled materials (old glass-ceramics, fined with these compounds)

in the vitrifiable load of raw materials. In any case, only traces of these toxic compounds are likely to be present: $As_2O_3+Sb_2O_3<1000$ ppm, preferably <500 ppm. Surprisingly, the interesting optical properties are still present even in case of the presence of 500 ppm≤$As_2O_3+Sb_2O_3$<1000 ppm.

$V_2O_5$ is therefore the main coloring agent of the glass-ceramics. Indeed, $V_2O_5$, in the presence of $SnO_2$, significantly darkens the glass during its ceramming (see above). $V_2O_5$ is responsible for absorption mainly below 700 nm and it is possible in its presence to retain sufficiently high transmission at 950 nm and in the infrared. An amount of $V_2O_5$ between 0.025 and 0.06% (between 250 and 600 ppm) (e.g., between 0.025 and 0.045%, or between 250 and 450 ppm) has proved to be adequate. Surprisingly, the interesting optical properties are still present even in case of the presence of 0.045%<$V_2O_5$<0.06%.

In a particular embodiment, a composition of the disclosed glass-ceramics, expressed as percentages by weight of oxides, contains:

| | |
|---|---|
| $SnO_2$ | 0.3-0.6, advantageously >0.3-0.6 |
| $V_2O_5$ | 0.025-0.045 |
| $Cr_2O_3$ | 0.01-0.04 |
| $Fe_2O_3$ | 0.05-0.15 |
| $As_2O_3 + Sb_2O_3$ | <0.1, advantageously <0.05. |

In another particular embodiment, a composition of the disclosed glass-ceramics, expressed as percentages by weight of oxides, contains:

| | |
|---|---|
| $SnO_2$: | 0.3-0.6, e.g. >0.3-0.6; |
| $V_2O_5$ | 0.025-0.045; |
| $Cr_2O_3$ | 0.01-0.04; |
| $Fe_2O_3$ | 0.05-0.15; and |
| $As_2O_3 + Sb_2O_3$ | <0.05. |

In the presence of $SnO_2$ and of $V_2O_5$, it has proved to be delicate to obtain for the sought glass-ceramics, both the required integrated optical transmission ($T_V$) and the required optical transmission at 625 nm ($T_{625}$). Indeed, insofar that the absorption due to vanadium is relatively high at this wavelength (625 nm), when an acceptable value is reached for the integrated optical transmission, the value of the optical transmission at 625 nm is too low and vice versa. Hence the non-obviousness of proposing $SnO_2$-fined glass-ceramics with the sought transmission curve. It is in fact to the credit of the inventors of having found the suitable coloring agent, to be associated in an adequate amount (also suitable with reference to the other required criteria of $T_{950}$ and $T_{1600}$) with $V_2O_5$ in order to obtain the desired values of $T_V$ and of $T_{625}$ together with adequate fining. This coloring agent is chromium oxide ($Cr_2O_3$).

It is suitable for providing the darkening agent function in the small wavelength of the visible range (400-600 nm) while retaining high transmission in the wavelengths between 600 and 800 nm. The desired result is therefore reached with the presence of $Cr_2O_3$ at a content from 0.01 to 0.04% by weight, in the composition of the glass-ceramics. Because of this presence in their composition, the glass-ceramics only show low transmission in the blue range. For a thickness of 4 mm, the glass-ceramics generally have an optical transmission at 450 nm of less than 0.1% ($T_{450}$<0.1%).

Iron oxide leads to absorption mainly in the infrared and its content should be of at least 500 ppm, advantageously at least 700 ppm in order to obtain the required transmission. If its content exceeds 1,500 ppm, absorption in the infrared is too high in the glass-ceramic but also in the initial glass, which makes it more difficult to be melted and fined. Advantageously, the iron oxide content is comprised between 700 and 1,200 ppm.

In the visible range, iron is also involved in the coloration process. It is noted here that its effect within the listed compositions may be compensated by that of the vanadium present. Thus, it was observed that at $Fe_2O_3$ contents greater than 0.09%, transmission in the visible range is slightly increased (probably at such $Fe_2O_3$ contents, $SnO_2$ preferentially reduces $Fe_2O_3$ and as a consequence the amount of reduced vanadium is lower). Such lightening of the glass-ceramic may then be compensated by a greater $V_2O_5$ content (however remaining within the range indicated above).

Within the scope of the disclosed embodiments, it is not excluded that the composition of the glass-ceramics contains in a more or less significant amount, in addition to $V_2O_5$, $Fe_2O_3$ and $Cr_2O_3$, of at least one other coloring agent such as $CoO$, $MnO_2$, $NiO$, $CeO_2$. However, it is out of the question that the presence of said at least one other coloring agent have a significant influence on the targeted optical transmission curve. Attention should notably be paid to possible interactions, capable, even with low levels of coloring agents, of significantly modifying said optical transmission curve. Thus, CoO may a priori only be present in a very small amount insofar that this element strongly absorbs in the infrared and in a non-negligible way at 625 nm. According to a preferred alternative, the composition of the glass-ceramics does not contain any CoO, in any case it contains less than 200 ppm of the latter, advantageously less than 100 ppm.

According to another preferred alternative, the composition of the glass-ceramics does not contain any fining auxiliaries such as F and Br. It does not contain any F and Br except for inevitable traces. This is particularly advantageous considering the price and/or the toxicity of these compounds. Within the disclosed compositions, the presence of fining auxiliary(ies) is a priori unnecessary insofar that $SnO_2$, present in the indicated amounts (≥0.3% by weight, advantageously>0.3% by weight) is highly effective as a fining agent.

The base composition of the glass-ceramics may vary to a great extent. By no means as a limitation, such a composition may be specified. In addition to $SnO_2$, $V_2O_5$, $Cr_2O_3$ and $Fe_2O_3$ in the weight percentages specified above (with $As_2O_3+Sb_2O_3<1000$ ppm, advantageously<500 ppm), such a composition may contain, in the weight percentages indicated hereafter:

| | |
|---|---|
| $SiO_2$ | 60-72 |
| $Al_2O_3$ | 18-23 |
| $Li_2O$ | 2.5-4.5 |
| MgO | 0-3 |
| ZnO | 1-3 |
| $TiO_2$ | 1.5-4 |
| $ZrO_2$ | 0-2.5 |
| BaO | 0-5 |
| SrO | 0-5 |
| with BaO + SrO | 0-5 |
| CaO | 0-2 |
| $Na_2O$ | 0-1.5 |
| $K_2O$ | 0-1.5 |
| $P_2O_5$ | 0-5 |
| $B_2O_3$ | 0-2 |

According to a preferred alternative, the glass-ceramics have a composition consisting of at least 98% by weight, advantageously at least 99% by weight, or even 100% by weight of $SnO_2$, $V_2O_5$, $Cr_2O_3$, $Fe_2O_3$ (with $As_2O_3+Sb_2O_3$<1000 ppm, advantageously<500 ppm) and of the oxides listed below (in the amounts specified above).

They have the same optical transmission curve as the glass-ceramic of the Kerablack® products while being free of any toxic fining agent ($SnO_2$ being involved instead of and in place of the arsenic oxide). It was seen that $SnO_2$ is a less effective fining agent than arsenic oxide but it is involved at relatively consequent levels (between 0.3 and 0.6% by weight) in the composition of the disclosed glass-ceramics. Moreover it is quite possible to use for the glass-ceramics a less viscous base glass (or having a lower high temperature viscosity) than that of the Kerablack® products, in order to facilitate melting and therefore fining. The combination of coloring agents $V_2O_5+Cr_2O_3+Fe_2O_3$ is quite compatible with such a base glass.

Said combination of coloring agents $V_2O_5+Cr_2O_3+Fe_2O_3$ is capable of containing high $Cr_2O_3$ and $Fe_2O_3$ contents. Thus, low cost raw materials are suitable insofar as iron and chromium are ordinary impurities of such low cost natural raw materials. This is particularly advantageous.

Moreover it is known that β-quartz glass-ceramics colored with vanadium oxide tend to darken during heat treatments subsequent to their ceramming treatment. The material may undergo such heat treatments during its use for example as a material making up cooktops. The disclosed glass-ceramics exhibit darkening during these heat treatments which is not more significant than that of Kerablack® glass-ceramics.

The glass-ceramics according to the disclosed embodiments therefore are particularly interesting substitutes for said Kerablack® glass-ceramics.

According to a second embodiment, the disclosure relates to articles at least partly consisting of a glass-ceramic as described above. Said articles advantageously consist in totality of a glass-ceramic as disclosed herein. Said articles advantageously consist of a cooktop, a cooking utensil or a microwave oven part. They very advantageously consist in a cooktop or a cooking utensil.

According to a third embodiment, the present disclosure relates to lithium aluminosilicate glasses, precursors of the disclosed glass-ceramics as described above. Said glasses have the weight composition of glass-ceramics as explained above. Incidentally, it may be noted that said precursor glasses advantageously have an optical transmission, for any wavelength comprised between 1,000 and 2,500 nm, of more than 60% for a thickness of 3 mm. Their melting and fining are then facilitated.

According to further embodiments, the present disclosure relates also to a method for elaborating a glass-ceramic as described above, and to a method for elaborating an article at least partly consisting of a glass-ceramic as described above.

Conventionally, said method for elaborating a glass-ceramic comprises the heat treatment of a vitrifiable load of raw materials, under conditions which successively ensure melting, fining and then ceramming.

In a characteristic way, said load has a composition with which it is possible to obtain a glass-ceramic as described above. In a characteristic way, said load is a precursor of a glass or of a glass-ceramic, advantageously having the base composition specified above, and containing, in any case, the amounts of $SnO_2$, $V_2O_5$, $Cr_2O_3$, $Fe_2O_3$ and optionally $As_2O_3+Sb_2O_3$, as indicated above.

Conventionally, said method for elaborating an article successively comprises melting of a vitrifiable load of raw materials, said load containing $SnO_2$ as a fining agent; followed by the fining of the obtained molten glass; cooling of the obtained fined molten glass and simultaneously, its shaping to the desired shape for the targeted article; and ceramming of said shaped glass.

In a characteristic way, said load has a composition with which it is possible to obtain a glass-ceramic as described above. In a characteristic way, said load is the precursor of a glass and of a glass-ceramic, advantageously having the base composition specified above, and containing in any case, the amounts of $SnO_2$, $V_2O_5$, $Cr_2O_3$, $Fe_2O_3$ and optionally of $As_2O_3+Sb_2O_3$, as indicated above.

When carrying out either one of the methods above, the load has advantageously an optical transmission for any wavelength comprised between a 1,000 and 2,500 nm, of more than 60%, for a thickness of 3 mm. As indicated above, the melting and fining operations are thereby facilitated.

It is now suggested to illustrate various embodiments by the examples hereafter.

EXAMPLES

In order to produce batches of 1 kg of precursor glass, the raw materials have been mixed carefully in the proportions (proportions expressed as weight percentages of oxides) copied into the first portion of Table 1 hereafter (Tables 1-a, 1-b and 1-c).

The mixtures are placed in platinum crucibles and melted at 1,650° C.

After melting, the glasses are rolled to a thickness of 5 mm and annealed at 650° C. for 1 hr.

Glass samples (in the form of plates of about 10 cm×10 cm) then undergo the following crystallization treatment: fast heating up to 650° C., heating from 650° C. to 820° C. at a heating rate of 5° C./min, heating from 820° C. to the maximum crystallization temperature, $T_{max}$, at a heating rate of 15° C./min, maintaining said temperature $T_{max}$ for a period t and then cooling at the cooling rate of the oven.

The values of $T_{max}$ and t are indicated in the second part of Table 1.

The optical properties of the obtained glass-ceramic plates are measured on polished samples with a thickness of 4 mm. The illuminant D65 (observer at 2°) was used.

The results are given in the third part of Table 1 hereafter: $T_v$ is the integrated transmission in the visible range $T_{450}$, $T_{625}$, $T_{950}$ and $T_{1600}$ are the transmissions measured at 450, 625, 950 and 1,600 nm respectively.

For Example 4, the transmission of the precursor glass was measured under 3 mm and the minimum transmission value measured between 1,000 and 2,500 nm is the one indicated (Table 1b).

The Examples A, B, C, D, E and F do not belong to the invention. Example A corresponds to the Kerablack® glass-ceramic which contains arsenic. The compositions of Examples B to F do not contain adequate contents (in the sense of the disclosed materials) of $V_2O_5$ and/or $Cr_2O_3$ and/or $SnO_2$ for obtaining the desired transmission.

TABLE 1-a

| Example | A | B | C | D | E |
|---|---|---|---|---|---|
| Composition | | | | | |
| $SiO_2$ | | 66.935 | 64.957 | 65.348 | 65.451 |
| $Al_2O_3$ | | 19.45 | 20.8 | 20.6 | 20.3 |
| $Li_2O$ | | 3.55 | 3.8 | 3.8 | 3.8 |
| MgO | | 1.1 | 0.38 | 0.37 | 0.37 |
| ZnO | | 1.45 | 1.5 | 1.5 | 1.5 |
| $TiO_2$ | | 2.8 | 2.95 | 2.95 | 3 |
| $ZrO_2$ | | 1.45 | 1.35 | 1.3 | 1.3 |
| BaO | | 2.4 | 2.45 | 2.45 | 2.5 |
| CaO | | 0.04 | 0.45 | 0.44 | 0.46 |
| $Na_2O$ | | 0.21 | 0.60 | 0.58 | 0.58 |
| $K_2O$ | | 0.13 | 0.21 | 0.21 | 0.24 |
| $As_2O_3$ | 0.5 | | | | |
| $SnO_2$ | | 0.40 | 0.43 | 0.28 | 0.37 |
| $V_2O_5$ | | 0.0225 | 0.0131 | 0.0621 | 0.0219 |
| $Fe_2O_3$ | | 0.0875 | 0.0886 | 0.0871 | 0.0826 |
| $Cr_2O_3$ | | | 0.0134 | 0.0150 | 0.0045 |
| CoO | | 0.0150 | 0.0079 | 0.0078 | |
| $MnO_2$ | | | | | 0.0200 |
| Ceramming treatment | | | | | |
| $T_{max}$ | | 920° C. | 970° C. | 920° C. | 920° C. |
| t | | 8 min | 7 min | 8 min | 10 min |
| Optical properties under 4 mm | | | | | |
| $T_v$ (%) | 1.63 | 2.78 | 5.54 | 0.89 | 0.89 |
| $T_{450}$ (%) | 0 | 0.46 | 0.25 | 0.02 | 0.07 |
| $T_{625}$ (%) | 6.44 | 8.59 | 13.44 | 3.21 | 2.85 |
| $T_{950}$ (%) | 55.14 | 67.84 | 71.51 | 64.53 | 60.18 |
| $T_{1600}$ (%) | 70.93 | 69.49 | 71.75 | 71.76 | 72.30 |

TABLE 1-b

| Example | F | 1 | 2 | 3 | 4 |
|---|---|---|---|---|---|
| Composition | | | | | |
| $SiO_2$ | 64.669 | 65.222 | 65.308 | 65.023 | 65.201 |
| $Al_2O_3$ | 20.7 | 20.6 | 20.50 | 20.8 | 20.7 |
| $Li_2O$ | 3.8 | 3.8 | 3.8 | 3.8 | 3.8 |
| MgO | 0.37 | 0.37 | 0.37 | 0.38 | 0.37 |
| ZnO | 1.5 | 1.5 | 1.5 | 1.5 | 1.5 |
| $TiO_2$ | 2.95 | 2.95 | 2.95 | 2.95 | 2.95 |
| $ZrO_2$ | 1.45 | 1.35 | 1.4 | 1.30 | 1.3 |
| BaO | 2.45 | 2.45 | 2.4 | 2.45 | 2.45 |
| CaO | 0.46 | 0.44 | 0.44 | 0.45 | 0.44 |
| $Na_2O$ | 0.60 | 0.58 | 0.58 | 0.60 | 0.58 |
| $K_2O$ | 0.23 | 0.21 | 0.21 | 0.22 | 0.22 |
| $As_2O_3$ | | | 0.03 | | |
| $SnO_2$ | 0.68 | 0.38 | 0.37 | 0.39 | 0.34 |
| $V_2O_5$ | 0.0395 | 0.0376 | 0.0347 | 0.0275 | 0.0403 |
| $Fe_2O_3$ | 0.0868 | 0.0882 | 0.0859 | 0.0884 | 0.0875 |
| $Cr_2O_3$ | | 0.0143 | 0.0135 | 0.0136 | 0.0134 |
| CoO | 0.0147 | 0.0079 | 0.0079 | 0.0080 | 0.0078 |
| $MnO_2$ | | | | | |
| Ceramming treatment | | | | | |
| $T_{max}$ | 920° C. | 920° C. | 920° C. | 970° C. | 920° C. |
| t | 8 min | 8 min | 8 min | 7 min | 8 min |
| Optical properties under 4 mm | | | | | |
| $T_v$ (%) | 0.42 | 1.26 | 1.86 | 1.37 | 1.29 |
| $T_{450}$ (%) | 0.03 | 0.04 | 0.07 | 0.03 | 0.04 |
| $T_{625}$ (%) | 1.70 | 4.27 | 5.83 | 4.34 | 4.34 |

TABLE 1-b-continued

| Example | F | 1 | 2 | 3 | 4 |
|---|---|---|---|---|---|
| $T_{950}$ (%) | 64.31 | 66.7 | 68.25 | 67.66 | 66.74 |
| $T_{1600}$ (%) | 69.01 | 71.6 | 72.07 | 71.52 | 71.87 |
| Precursor glass | | | | | |
| T (%) minimum between 1,000 and 2,500 nm | | | | | 75.90 |

TABLE 1-c

| Example | 5 | 6 | 7 |
|---|---|---|---|
| Composition | | | |
| $SiO_2$ | 65.150 | 65.171 | 65.049 |
| $Al_2O_3$ | 20.8 | 20.7 | 20.80 |
| $Li_2O$ | 3.8 | 3.8 | 3.8 |
| MgO | 0.35 | 0.35 | 0.35 |
| ZnO | 1.5 | 1.5 | 1.5 |
| $TiO_2$ | 2.95 | 2.95 | 3 |
| $ZrO_2$ | 1.25 | 1.3 | 1.25 |
| BaO | 2.45 | 2.45 | 2.45 |
| CaO | 0.46 | 0.44 | 0.45 |
| $Na_2O$ | 0.57 | 0.57 | 0.57 |
| $K_2O$ | 0.22 | 0.22 | 0.22 |
| $As_2O_3$ | | | |
| $SnO_2$ | 0.36 | 0.38 | 0.38 |
| $V_2O_5$ | 0.0388 | 0.0373 | 0.0407 |
| $Fe_2O_3$ | 0.0876 | 0.1177 | 0.1245 |
| $Cr_2O_3$ | 0.0136 | 0.0140 | 0.0158 |
| CoO | | | |
| $MnO_2$ | | | |
| Ceramming treatment | | | |
| $T_{max}$ | 920° C. | 920° C. | 920° C. |
| t | 8 min | 8 min | 8 min |
| Optical properties under 4 mm | | | |
| $T_y$ (%) | 1.69 | 1.72 | 1.24 |
| $T_{450}$ (%) | 0.06 | 0.06 | 0.03 |
| $T_{625}$ (%) | 5.34 | 5.37 | 4.09 |
| $T_{950}$ (%) | 67.39 | 63.95 | 62.35 |
| $T_{1600}$ (%) | 74.06 | 69.45 | 68.76 |

For Example 1, Table 2 hereafter reports a few properties measured on the glass-ceramic, including the coefficient of thermal expansion (CTE), the percentage (by weight, based on the total crystallized fraction) and the average size of the crystals of the beta-quartz solid solution (% of beta-quartz and size of the crystals). X-ray diffraction analysis was carried out with a diffractometer operating with monochromatic radiation from a Cu cathode and having a fast multi-channel linear detector (Real Time Multichannel Scaler RTMS).

TABLE 2

| Example | 1 |
|---|---|
| Composition | |
| $SiO_2$ | 65.222 |
| $Al_2O_3$ | 20.6 |
| $Li_2O$ | 3.8 |
| MgO | 0.37 |
| ZnO | 1.5 |
| $TiO_2$ | 2.95 |
| $ZrO_2$ | 1.35 |

TABLE 2-continued

| Example | 1 |
|---|---|
| BaO | 2.45 |
| CaO | 0.44 |
| $Na_2O$ | 0.58 |
| $K_2O$ | 0.21 |
| $SnO_2$ | 0.38 |
| $V_2O_5$ | 0.0376 |
| $Fe_2O_3$ | 0.0882 |
| $Cr_2O_3$ | 0.0143 |
| CoO | 0.0079 |
| Crystallization treatment | |
| Tmax | 920° C. |
| t | 8 min |
| Properties of the glass-ceramic | |
| $CTE_{25-700°\,C.}$ $(10^{-7}\,K^{-1})$ | 1.8 |
| XRD: | |
| % beta-quartz | 96 |
| Size of the crystals | 29 nm |

Embodiments are also illustrated by the following examples, which have been carried out with melting of a vitrifiable mixture in an industrial furnace. In each case, the glass was formed by rolling to a thickness of 4 mm, annealed and then cut out. A glass sample was then subject to the ceramming treatment described above. The optical properties were measured as described above.

In the case of Example 8, a sample of the obtained glass-ceramic was subject to ageing treatment for 100 h at 725° C. The integrated transmission, $T_y$, was measured before and after this ageing treatment on a polished sample with a thickness of 3 mm. The same data are indicated for the Kerablack® materials. It is seen that the glass-ceramic as disclosed herein does not lose more in transmission than Kerablack®.

TABLE 3

| Example | 8 | 9 | 10 | Kerablack ® |
|---|---|---|---|---|
| Composition | | | | |
| $SiO_2$ | 65.163 | 65.111 | 65.292 | |
| $Al_2O_3$ | 20.7 | 20.8 | 20.6 | |
| $Li_2O$ | 3.75 | 3.75 | 3.75 | |
| MgO | 0.33 | 0.32 | 0.37 | |
| ZnO | 1.5 | 1.5 | 1.5 | |
| $TiO_2$ | 2.9 | 2.9 | 2.9 | |
| $ZrO_2$ | 1.3 | 1.3 | 1.3 | |
| BaO | 2.5 | 2.5 | 2.5 | |
| CaO | 0.48 | 0.45 | 0.44 | |
| $Na_2O$ | 0.6 | 0.6 | 0.6 | |
| $K_2O$ | 0.23 | 0.22 | 0.21 | |
| $SnO_2$ | 0.41 | 0.4 | 0.32 | |
| $V_2O_5$ | 0.0338 | 0.0341 | 0.0360 | |

TABLE 3-continued

| Example | 8 | 9 | 10 | Kerablack® |
|---|---|---|---|---|
| $Fe_2O_3$ | 0.0928 | 0.091 | 0.115 | |
| $Cr_2O_3$ | 0.0168 | 0.0201 | 0.022 | |
| CoO | 0.0036 | 0.0038 | 0.0010 | |
| $As_2O_3$ | | | | 0.044 |
| Ceramming treatment | | | | |
| Tmax | 920° C. | 920° C. | 920° C. | |
| T | 8 min | 8 min | 8 min | |
| Optical properties under 4 mm | | | | |
| $T_v$ (%) | 1.36 | 1.45 | 1.14 | |
| $T_{450}$ (%) | 0.03 | 0.03 | 0.01 | |
| $T_{625}$ (%) | 4.41 | 4.66 | 3.75 | |
| $T_{950}$ (%) | 67.35 | 67.6 | 64.38 | |
| $T_{1600}$ (%) | 71.77 | 72.07 | 69.99 | |
| Optical properties under 3 mm | | | | |
| $T_v$ (%) | 3.39 | | | 2.76 |
| $T_v$ (%) after 100 hrs at 725° C. | 1.42 | | | 0.72 |

A fining test with precursor glasses (of Examples 11 and comparative example G) was conducted.

Both glasses, the composition of which is indicated in Table 4 hereafter, were melted. The compositions differ by their $SnO_2$ content, otherwise the same raw materials were used for making both glasses.

After mixing, the raw materials required for obtaining 1 kg of glass were placed for melting (and fining) in platinum crucibles. The filled crucibles were introduced into an electric furnace pre-heated to 1400° C. Therein, they were subject to the melting cycle hereafter: rise in temperature from 1,400° C. to 1,600° C. within 2 hrs, rise in temperature from 1,600° C. to 1,630° C. within 1 hour, and maintaining 1,630° C. for 1 hour.

The crucibles were then taken out of the furnace and the molten glass was poured on a heated steel plate. It was then rolled to a thickness of 5 mm and annealed for 1 hr at 650° C.

Because of the short holding time at 1,630° C., the fining is incomplete. The number of bubbles in the plates was automatically counted by a camera coupled with an image analyzer.

The results are given in Table 4 hereafter, expressed in number of bubbles per $cm^3$. They show that the glass containing an $SnO_2$ content of 0.39% (Example 11) is better fined during this test than the one which only contains 0.29% of $SnO_2$ (Example G).

TABLE 4

| | Example | |
|---|---|---|
| Composition | 11 | G |
| $SiO_2$ | 64.978 | 65.068 |
| $Al_2O_3$ | 20.6 | 20.6 |
| $Li_2O$ | 3.8 | 3.8 |
| MgO | 0.4 | 0.4 |
| ZnO | 1.55 | 1.55 |
| $TiO_2$ | 2.95 | 2.95 |
| $ZrO_2$ | 1.35 | 1.35 |
| BaO | 2.5 | 2.5 |
| CaO | 0.45 | 0.45 |

TABLE 4-continued

| | Example | |
|---|---|---|
| Composition | 11 | G |
| $Na_2O$ | 0.6 | 0.6 |
| $K_2O$ | 0.22 | 0.22 |
| $SnO_2$ | 0.38 | 0.29 |
| $V_2O_5$ | 0.04 | 0.04 |
| $Fe_2O_3$ | 0.087 | 0.087 |
| $Cr_2O_3$ | 0.015 | 0.015 |
| CoO | 0.008 | 0.008 |
| Number of bubbles per $cm^3$ | 9 | 20 |

We claim:

1. A glass-ceramic of the lithium aluminosilicate type, containing a beta-quartz solid solution as the predominant crystalline phase and having for a thickness of 4 mm:
   an integrated optical transmission, $T_v$, in the visible range, between 0.8 and 2%,
   an optical transmission at 625 nm of more than 3.5%
   an optical transmission at 950 nm between 50 and 70%, and
   an optical transmission at 1,600 nm between 65 and 75%,
   wherein the optical transmissions are measured after a ceramming that comprises (in sequence): (a) heating to 650° C., (b) heating from 650° C. to 820° C. at a heating rate of 5° C./min, (c) heating from 820° C. to $T_{max}$ at a heating rate of 15° C./min and holding at $T_{max}$ for about 7 to 10 minutes; and (d) cooling from $T_{max}$ at an oven cooling rate, wherein $T_{max}$ is between about 920° C. and about 970° C.,
   wherein the composition of the glass-ceramic, expressed as percentages by weight of oxides, contains:
   $SnO_2$ 0.3-0.6
   $V_2O_5$ 0.025-0.060
   $Cr_2O_3$ 0.01-0.04
   $Fe_2O_3$ 0.05-0.15
   $As_2O_3+Sb_2O_3<0.1$, and
   wherein the composition further comprises as base oxides expressed as percentages by weight of oxides:

| | |
|---|---|
| $SiO_2$ | 60-72 |
| $Al_2O_3$ | 18-23 |
| $Li_2O$ | 2.5-4.5 |
| MgO | 0-3 |
| ZnO | 1-3 |
| $TiO_2$ | 1.5-4 |
| $ZrO_2$ | 0-2.5 |
| BaO | 0-5 |
| SrO | 0-5 |
| with BaO + SrO | 0-5 |
| CaO | 0-2 |
| $Na_2O$ | 0-1.5 |
| $K_2O$ | 0-1.5 |
| $P_2O_5$ | 0-5 |
| $B_2O_3$ | 0-2, | and
   further wherein the composition contains less than 200 ppm of CoO.

2. The glass-ceramic according to claim 1, the composition of which contains:
   $SnO_2$ 0.36-0.6,
   $V_2O_5$ 0.025-0.045
   $Cr_2O_3$ 0.01-0.04
   $Fe_2O_3$ 0.05-0.15
   $As_2O_3+Sb_2O_3<0.05.$ 3. The glass-ceramic according to claim 1, the composition of which contains:

$SnO_2$ 0.34-0.39
$V_2O_5$ 0.028-0.041
$Cr_2O_3$ 0.013-0.016.

4. The glass-ceramic according to claim 1, the composition of which contains $0.07 \leq Fe_2O_3 < 0.12$.

5. The glass-ceramic according to claim 1, the composition of which is free of F and of Br, except for inevitable traces.

6. The glass-ceramic according to claim 1, the composition of which comprises at least 98% by weight of $SnO_2$, $V_2O_5$, $Cr_2O_3$, $Fe_2O_3$ and of said base oxides, with $As_2O_3 + Sb_2O_3 < 1000$ ppm.

7. An article comprising a glass-ceramic according to claim 1.

8. A lithium aluminosilicate glass precursor, the composition of said glass corresponding to the glass-ceramic according to claim 1.

9. The glass-ceramic according to claim 1, the composition of which contains:

$SnO_2$ 0.3-0.4,
$V_2O_5$ 0.025-0.045, and
$Cr_2O_3$ 0.01-0.03.

* * * * *

UNITED STATES PATENT AND TRADEMARK OFFICE
CERTIFICATE OF CORRECTION

PATENT NO. : 9,650,286 B2
APPLICATION NO. : 14/117383
DATED : May 16, 2017
INVENTOR(S) : Marie Jacqueline Monique Comte et al.

Page 1 of 1

It is certified that error appears in the above-identified patent and that said Letters Patent is hereby corrected as shown below:

In the Claims

In Column 14, Line 63, Claim 2, delete "0.36-0.6," and insert -- 0.36-0.6 --, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*